UNITED STATES PATENT OFFICE.

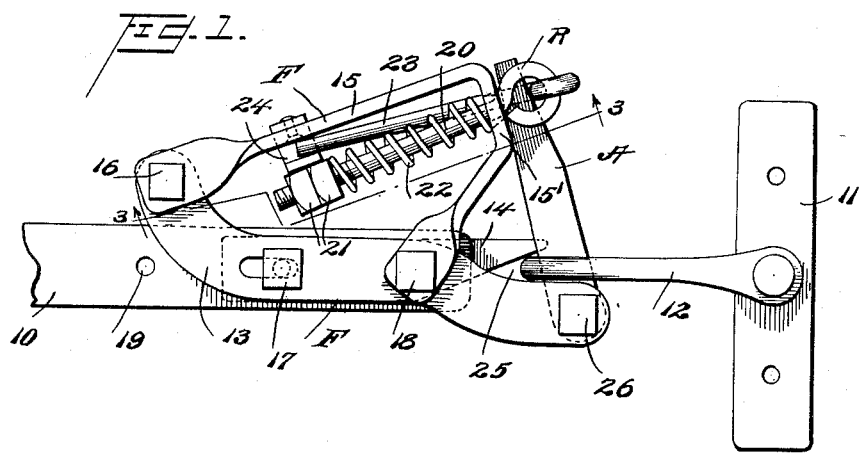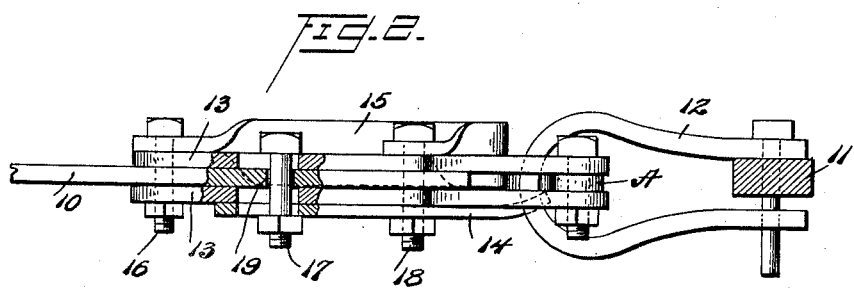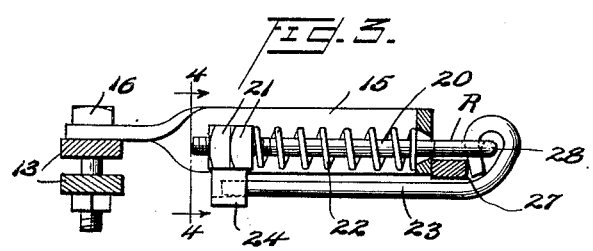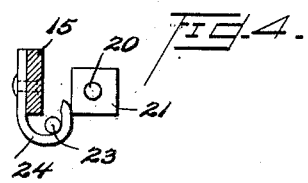

ALBERT B. HULSEBOS AND GERRITT DEN BESTEN, OF CORSICA, SOUTH DAKOTA, ASSIGNORS TO SAFETY RELEASE CLEVIS COMPANY, OF CORSICA, SOUTH DAKOTA, A PARTNERSHIP CONSISTING OF ALBERT A. HULSEBOS, GERRITT DEN BESTEN, HENRY KETEL, AND H. N. WAITE.

AUTOMATICALLY-RELEASING COUPLING.

1,384,258.  Specification of Letters Patent.  Patented July 12, 1921.

Application filed October 4, 1920. Serial No. 414,546.

*To all whom it may concern:*

Be it known that we, ALBERT B. HULSEBOS and GERRITT DEN BESTEN, citizens of the United States, and residing at Corsica, Douglas county, State of South Dakota, have invented certain new and useful Improvements in Automatically - Releasing Couplings, of which the following is a specification.

This invention relates to automatically releasing couplings and particularly to couplings of this character which are adapted to be included in the connection between a vehicle or farming implement and a tractor or other power means for drawing the same. In the use of plows or other soil stirring implements it is desirable to employ a connection which will automatically uncouple the implement from the draft horses or the tractor to which it is attached, when the implement unexpectedly strikes a rock or a tree root or other obstruction, and thereby prevent injury to the same, or to the tractor, or rupture of the connecting means.

The objects of the present invention are to provide a device of this class which is adapted to be connected to the hitch bar of the vehicle or implement to be drawn and which is so designed and constructed that it may be made lighter in weight than similar devices of the same capacity which have been heretofore employed; which insures that the pull of the horses or power device is exerted exactly in line with the axis of the hitch bar; in which the parts are subjected to but little breaking strain in the operation of the device; and which prevents the attachment to an implement of an oversize clevis or draft link which might result in the over-straining of a relatively light weight coupling.

The invention may be made in various forms and one embodiment thereof is described herein and illustrated in the accompanying drawings, in which:

Figure 1 is a plan view of the coupling secured to the hitch bar of a farm implement;

Fig. 2 is a side view of the same, part being broken away;

Fig. 3 is a section on the line 3—3 of Fig. 1; and

Fig. 4 is a section on the line 4—4 of Fig. 3.

The hitch bar of the plow, cultivator, or other implement is indicated at 10 and a portion of the draft rigging of a tractor or other power device is indicated at 11, a clevis 12 pivotally connected to the member 11 extending rearwardly therefrom and being releasably connected to the hitch bar by the improved releasable coupling, which is so designed and constructed that the clevis 12 is always in line with the axis of the hitch bar so long as the tractor is pursuing a straight path. The releasable coupling comprises a frame F and arm A pivotally connected to the front of the frame, and a spring controlled latch or releasing means R supported on the frame for releasably retaining the free end of the arm A. The frame includes two similarly formed parallel members 13 which lie on opposite sides of the hitch bar, a guard member 14 and a strap 15 which extends laterally from the hitch bar and is provided for the purpose of supporting the spring controlled means R. Bolts 16, 17 and 18 constitute the means for securing the component parts of the frame members together and bolts 17 and 18 also comprise the means for securing the frame to the hitch bar, these bolts extending through two of the usual holes 19 of the hitch bar and through suitable apertures in the members 13, 14 and 15. The bolt 17 extends through alined slots in these members, as will be seen clearly in Fig. 2, the slots being provided so that the frame may be attached to hitch bars of different design, in which the aperture for the bolts are differently spaced. The ends of the strap 15 are secured by bolts 16 and 18 to the other members of the frame.

It will be seen that the members 13 are curved outwardly at their forward ends and that the guard member 14 is cut away or tapered at its forward end leaving a jaw or opening 25 between these members which is directly in front of the end of the hitch bar. In this opening the rear end of the clevis 12 is positioned and the clevis is held in such position by the arm A, which is pivotally secured at one end to the members 13 as by a bolt 26 and releasably secured at the other end to the frame by means of the spring controlled releasing mechanism hereinafter to be described. The arm A, which extends transversely of the hitch bar retains the clevis so long as the desired tension in the connection is not exceeded, but upon the tension becoming excessive the outer end of the arm will be automatically released and the arm will pivot about its inner end to release the clevis.

The spring controlled means for releasably securing the outer end of the arm A comprises a bolt 20 which extends through an opening in the front leg 15' of the strap 15 and is provided at its forward end with an eye and at its rear end with a threaded portion upon which the two nuts 21 are screwed, a spring 22 bearing at one end against the strap and at the other end against one of the nuts 21, a latch member 23 pivotally connected to the eye of the bolt 20 and extending rearwardly parallel thereto, and a keeper 24 bolted to the strap 15 and adapted to retain the end of the latch 23.

The spring 22 opposes forward movement of the bolt 20 and, in the use of the coupling, prevents the releasing of the arm A so long as the connection is placed under no excessive strain. When, however, the implement being drawn strikes an obstruction and the strain upon the connection between the implement and tractor tends to become excessive the spring will be compressed and will allow the bolt 20 to move forwardly to such an extent that the end of the latch 23 will become disengaged from the keeper 24 whereupon it will release the end of arm A. By means of the nuts 21 the spring 22 may be adjusted to release the arm at any desired pull in the connection.

It will be seen from Fig. 1 that the triangular opening 25 between the forward end of the guard 14 and the members 13 and the back of the arm A is only sufficiently large to accommodate a clevis of the size illustrated. It is therefore impossible to connect to the coupling, clevises of larger size, which might put greater strain on the arm.

The clevis is positively prevented by the guard member 14 from moving along the arm A and thereby increasing the lever arm of the pulling force about the pivotal point 26 of the arm A. From the drawings it can be seen that the lever arm of the force exerted by the clevis 12 on the arm A is relatively short and that the lever arm of the resisting force of the spring 22 is relatively long, (taking moments about the pivotal point 26 of the arm A). By arranging the parts in this manner a much lighter spring may be used and in fact the entire coupling may be made considerably lighter to perform the same work as other couplings of this character heretofore suggested. Because of the fact that the pull on the clevis is directly in line with the axis of the hitch bar the component parts of the frame may be made lighter than would be the case if the pull of the clevis were eccentric or offset from the line of the hitch bar.

In certain prior constructions the clevis has been hooked onto the latch at a point such as indicated at 27, Fig. 3. In actual use, it has been found that larger clevises have been used than the design permitted with the result that the contact point between the clevis and latch member was farther from its pivot point 28 desired. The moment of the latch about its pivot 28 was thereby increased and the wear on the keeper 24 excessive. With the present device the clevis can be connected to the hitch at one point only, and the latch and keeper cannot be subjected to greater moments than contemplated. This is an important feature of the present invention.

Obviously, changes may be made in the design and arrangement of the component parts of the invention and it is therefore not limited in its scope to the exact embodiment disclosed.

Having thus described the invention what we claim as new and desire to secure by Letters Patent is:

1. In a device of the class described, a frame adapted to be secured to a vehicle or implement, an arm pivoted to said frame and adapted to releasably retain a clevis or link connected to a power device, and means including a latch, keeper and spring for releasably securing the free end of said arm to said frame.

2. In a device of the class described, a frame adapted to be secured to a vehicle or implement, an arm pivoted to said frame and extending transversely thereof and adapted to releasably retain a clevis or link connected to a power device, and spring controlled means including a latch and keeper, for releasably securing the free end of said arm to said frame.

3. In a device of the class described, a frame adapted to be secured to a vehicle or implement, an arm pivoted to the front of said frame and inclined rearwardly and adapted to releasably retain a clevis or link connected to a power device, and means including a latch, keeper and spring for releasably securing the free end of said arm to said frame, said spring being disposed in the plane of said frame and with its axis at right angles to said arm.

4. In a device of the class described a frame adapted to be secured to a vehicle or implement, an arm pivoted to the front of said frame and inclined rearwardly and adapted to releasably retain a clevis or link connected to a power device, and means for releasably securing the free end of said arm including a bolt slidably supported in the frame and disposed at right angles to the arm, a spring normally opposing forward movement of the bolt, a latch pivotally connected to the bolt and a keeper mounted on the frame for normally retaining the free end of said latch.

5. In a device of the class described, in combination, a frame adapted to be secured to the hitch bar of a vehicle or implement, and having forwardly projecting laterally diverging portions positioned on opposite sides of the axis of the hitch bar, a transversely disposed arm extending across the opening between said portions and having one end pivoted to one of the projecting portions of the frame, said projecting portions and arm inclosing a triangular space adapted to receive a clevis and the arm being adapted to releasably retain the clevis, and a spring controlled means secured to the frame to one side of said opening and relatively remote therefrom for releasably securing the free end of said arm to the frame.

In testimony whereof we affix our signatures.

ALBERT B. HULSEBOS.
GERRITT DEN BESTEN.